United States Patent Office 3,631,037
Patented Dec. 28, 1971

3,631,037
1-SUBSTITUTED-2,5-DIPHENYLPYRROLES
Robert Louis Duncan, Jr., and William J. Welstead, Jr., Richmond, Va., assignors to A. H. Robins Company, Incorporated, Richmond, Va.
No Drawing. Filed June 21, 1968, Ser. No. 738,781
Int. Cl. C07d 27/26, 87/38
U.S. Cl. 260—247  4 Claims

ABSTRACT OF THE DISCLOSURE 1-substituted - 2,5 - diphenylpyrroles having analgetic activity are disclosed. The novel compounds are prepared by cyclization of 1,2-dibenzoylethane with amines and alkylation of 2,5-diphenylpyrroles.

The present invention relates to certain novel 1-substituted-2,5-diphenylpyrroles, methods of making and using them, and acid-addition salts thereof.

The invention is especially concerned with novel 1-substituted-2,5-diphenylpyrroles having the formula:

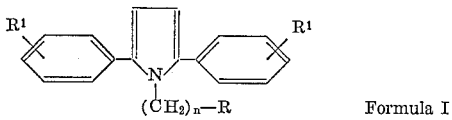

Formula I wherein;

R is selected from the group consisting of amino, di-lower-alkyl amino, hydroxy, 1,2-glycol, 2-dioxolan-one, aryloxy, carbamoyloxy, morpholinyl, N-acylpiperidinyl-b-carbonyloxy, N-acylpiperazinyl-4-carbonyloxy, pyrrolidinyl, and piperidinyl, $R^1$ is selected from the group consisting of hydrogen, lower alkyl, lower alkoxy, trifluoromethyl, and halogen of atomic weight less than 80, n is an integer from 1 to 5 inclusive, and acid-addition salts thereof.

The compounds corresponding to Formula I are useful as analgetics as demonstrated in tests conducted in accordance with the Nilsen experimental method [P. Nilsen, Acta, Phar. et Toxicol., 18, 10 (1961)] on standard test animals.

The primary object of this invention is to provide novel 1-substituted-2,5-diphenylpyrroles and processes for their production, the pyrroles being effective analgetics. Another object of the present invention is to provide acid addition salts of the pyrroles. Still another object of the present invention is to provide analgetic preparations comprising the novel pyrroles and their acid addition salts. Other objects of the present invention will be apparent to one skilled in the art, and still other objects will become apparent from the following description and the appended claims.

In the definition of symbols in the forgeoing Formula I and where they appear elsewhere throughout this specification, the terms have the following significance:

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, octyl, and the like. "Lower alkoxy" has the formula O-lower-alkyl.

Among the suitable amino radicals included herein are primary, secondary, and tertiary amino radicals, such as unsubstituted amino (—$NH_2$), (lower-alkyl)-amino, di-(lower-alkyl)-amino, phenylamino, and basic saturated monocyclic heterocyclic radicals as exemplified by piperidinyl, pyrrolidinyl, morpholinyl and piperazinyl.

When halogen is referred to herein, preferably but not necessarily a halogen of atomic weight in excess of eighteen but not greater than eighty is employed.

By "aryl" is meant an aryl radical having six ring carbon atoms, this term including the unsubstituted phenyl radical and phenyl radicals substituted by any radical or radicals which are not reactive or otherwise interfering under conditions of the reaction, such as lower-alkoxy, trifluoromethyl, lower-alkyl, halo, and the like. The substituted-phenyl radicals have preferably no more than one to three substituents such as those given above, and furthermore these substituents can be in various available positions of the phenyl nucleus and where more than one substituent is present can be the same or different and can be in various position combinations relative to each other. The lower-alkyl and lower-alkoxy substituents each have preferably from one to three carbon atoms which can be arranged as straight or branched chains. "Aryloxy" has the formula —O—aryl.

This invention also includes acid-addition salts of the above defined bases formed with non-toxic organic and inorganic acids. Such salts are easily prepared by methods known in the art. When the compounds are to be used as intermediates for preparing other compounds or for any other non-pharmaceutical use, the toxicity or non-toxicity of the salt is immaterial; when the compounds are to be used as pharmaceuticals, they are most conveniently used in the form of non-toxic acid-addition salts. Both toxic and non-toxic salts are therefore within the purview of the invention. The acids which can be used to prepare the preferred non-toxic acid-addition salts are those which produce, when combined with the free bases, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those formed with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric and nitric acids.

Generally speaking, the novel compounds of this invention may be prepared from readily available starting materials or from compounds which can be prepared by known laboratory procedures. Thus, the novel compounds of the invention embraced by Formula I given hereinabove are prepared by various procedures illustrated by reaction sequences A–D given below.

(A)

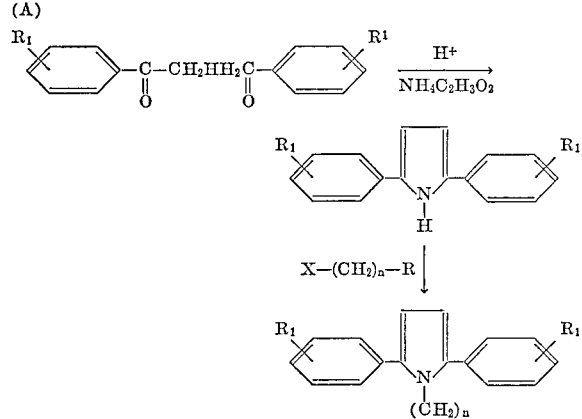

(B)

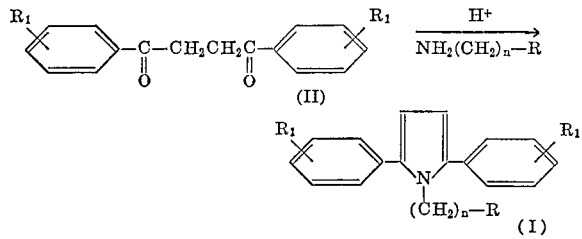

(C)

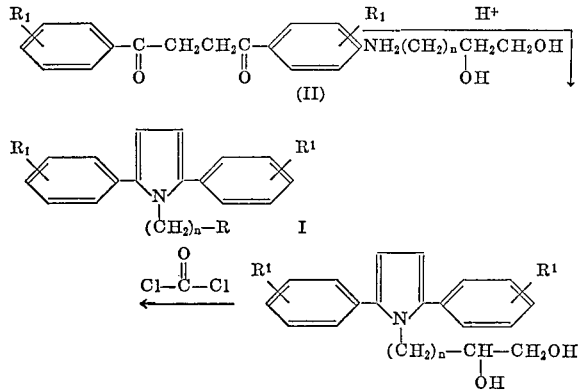

(D)

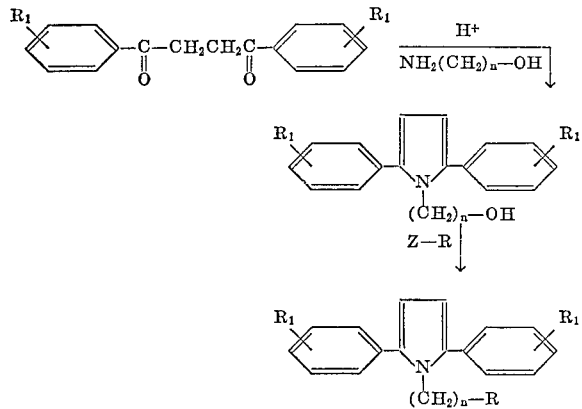

(A) In procedure A, a 1,2-dibenzoylethane (II) is cyclized by refluxing in an acidic medium provided by the addition of acids, as for example, polyphosphoric, sulfuric, hydrochloric and acetic, glacial acetic acid being preferred with an excess of ammonium acetate to give a 2,5-diphenylpyrrole. The 2,5-diphenylpyrrole is then reacted with a compound of the formula X—$(CH_2)_n$—R, wherein X is a halogen, preferably bromine or chlorine, and R and $n$ have the values previously assigned. The 2,5-diphenylpyrrole is added dropwise to an inert solvent mixture containing a metal hydride, preferably sodium hydride. Examples of inert solvents which can be used include dimethylformamide, dimethyl sulfoxide, benzene, toluene, xylene and the like. Dimethylformamide is especially preferred as a solvent. The solvent mixture is heated to a temperature of about 50° C. to about 160° C. for a period of one to two hours to permit formation of the metal salt of the 2,5-diphenylpyrrole, the amine-alkyl-halide or the aryloxy-alkyl-halide is then added. The reaction mixture is heated for a period of from about two hours to about 24 hours, depending on the reaction temperature. After the reaction is completed, water is added and the mixture is extracted with an organic solvent as, for example, ether or benzene. The combined extracts are dried and concentrated. The crude products obtained from the reaction mixture are purified by crystallization from a suitable solvent, chromatography or formation of a readily crystallizable organic or inorganic salt.

(B) Compounds within the scope of Formula I are prepared in accordance with procedure B by reacting a compound of Formula II given above with a compound having the general formula $NH_2(CH_2)_n$—R, wherein R is as previously defined hereinabove. The reaction is best carried out in an acidic reaction medium which can also contain a lower alkanol under refluxing conditions for a period of about two to twenty hours. Isolation of the product is achieved by dilution of the reaction mixture with water, basification using dilute alkali and extraction of the base insoluble material with a suitable solvent as, for example, ether. The combined organic extracts are dried and concentrated and the residual crude product is purified by methods described in (A) above.

(C) The preparation of certain novel compounds within the scope of Formula I is carried out according to reaction sequence (C). A compound of Formula II in an acidic medium containing a lower alkanol solvent is reacted with omega-aminoalkyl-1,2-diol. After refluxing the stirred reaction mixture for a period of from ten to about twenty hours, the reaction mixture is cooled, diluted with water, the product extracted from the acidic mixture with a water-insoluble solvent such as chloroform and the crude product remaining after evaporation of the solvent is crystallized from an appropriate solvent.

The product, a 1-(omega-1,2-diolalkyl)-2,5-diphenylpyrrole, a novel compound within the scope of Formula I can be used to prepare other novel compounds, thus reacting the 1-(omega-1,2-diolalkyl)-2,5-diphenylpyrrole of the mixture with phosgene gives a 4-[1-(2,5-diphenylpyrryl)alkyl]-2-dioxolanone. The reaction is preferably carried out at room temperature under anhydrous conditions. A chloroform solution containing an excess amount of phosgene is added dropwise to a chloroform solution containing the pyrrole and the reaction mixture is stirred for a period of from two to about five hours. The reaction mixture is then added to a base, preferably concentrated ammonium hydroxide solution and stirred thirty minutes to one hour. The organic layer is separated, dried, the solvent evaporated, and the residual product purified in the same manner as described in procedure (A).

(D) In procedure D, a compound of Formula II dissolved in an acidic medium containing a lower alkanol is treated with an equimolar amount of an aminoalkanol. The reaction mixture is refluxed for a period of about ten to about twenty hours. The cooled reaction mixture is diluted with water and the product extracted with an organic solvent as, for example, chloroform. The product, a 1-omega-hydroxyalkyl-2,5-diphenylpyrrole within the scope of the general Formula I is further reacted with a compound Z–R, wherein Z–R is an alkylisocyanate, a 1-lower acyl isonipecotoyl halide or a N-lower acyl-N⁴- piperazinyl acetyl halide. When Z–R is an alkylisocyanate, the reactants are reacted in a dry organic solvent medium, preferably benzene. When Z–R is a 1-lower acyl isonipecotoyl halide or an N-lower acyl-N⁴-piperazinyl acetyl halide, the reactants are combined in a dry organic solvent as, for example, chloroform containing an excess of a suitable acid acceptor, including sodium carbonate, sodium bicarbonate, potassium carbonate and the like. The reaction mixture is refluxed for a period of from about sixteen to about twenty-four hours, followed by dilution with water. The organic layer is separated, dried, filtered and concentrated. The product is preferably purified by crystallization from a lower-alkanol solvent.

The examples below illustrate in detail some of the compounds which comprise this invention and methods for their production. However, this invention is not to be construed as limited thereby in spirit or in scope. It will be apparent to one skilled in the art that numerous modifications in materials and methods can be adopted without departing from the invention.

EXAMPLE 1

1-(2-dimethylaminoethyl)-2,5-diphenylpyrrole hydrochloride

A solution of 6.5 g. (0.03 mole) of 2,5-diphenylpyrrole in 25 ml. of dimethylformamide was slowly added to a stirring mixture of 2.72 g. (0.06 mole) of sodium hydride (53% suspension) in 75 ml. of dimethylformamide. The mixture was refluxed for one hour. A solution of 4.32 g. (0.03 mole) β-chloro-(N,N-dimethyl)ethylamine hydrochloride in 25 ml. of dimethylformamide was slowly added and the mixture was refluxed for two and one half hours. The mixture was cooled and water added. The aqueous solution was extracted with ether. The ethereal extracts were dried and filtered. After concentrating the filtrate, the residual oil was dissolved in 20 ml. of benzene and placed on a magnesium silicate column. Upon elution with benzene-acetone mixtures, 4 g. (48%) of the 1-(2-dimethylaminoethyl)-2,5-diphenylpyrrole was obtained as a yellow oil. The hydrochloride salt was prepared in the usual manner. After decolorization with charcoal and recrystallization from isopropanol, the hydrochloride salt melted at 219–222° C.

*Analysis.*—Calculated for $C_{20}H_{23}ClN_2$ (percent): C, 73.49; H, 7.09; N, 8.57. Found (percent): C, 73.46; H, 7.21; N, 8.36.

Using the procedure of Example 1, 2,5-diphenylpyrrole is reacted with 3-chloro-(N,N-diethyl)propylamine hydrochloride to produce 1-(3-diethylaminopropyl)-2,5-diphenylpyrrole.

Using the procedure of Example 1, 2,5-bis(4-chlorophenyl)pyrrole is reacted with 4-chloro-(N,N-dipropyl)butylamine hydrochloride to produce 1-(4-dipropylaminobutyl)-2,5-bis(4-chlorophenyl)pyrrole.

EXAMPLE 2

2,5-diphenyl-1-[3-(4-fluorophenoxy)propyl]pyrrole

A solution of 5.5 g. (0.025 mole) of 2,5-diphenylpyrrole was added dropwise to a stirring mixture of 2.3 g. (0.05 mole) of sodium hydride (53% suspension in mineral oil) in 100 ml. of dimethylformamide. While heating this mixture to 60° C., 5.85 g. (0.025 mole) of 3-(4-fluorophenoxy)propyl bromide was added dropwise. The mixture was heated at 60° C. for four hours and allowed to stand at room temperature for 16 hours. Water was added to the mixture and the gummy solid which separated was extracted into ether. The ethereal extracts were dried over anhydrous sodium sulfate and filtered. The filtrate was concentrated under reduced pressure. The solid residue was recrystallized with a methanol-water mixture and 4 g. (43%) of crude solid was obtained. Recrystallization of this crude solid from methanol gave 2.5 g. of yellow needles melting at 77.5–79.5° C.

*Analysis.*—Calculated for $C_{25}H_{22}FNO$ (percent): C, 80.83; H, 5.97; N, 3.77. Found (percent): C, 80.65; H, 6.15; N, 3.82.

Utilizing the procedure of Example 2, the following compounds are prepared:

2,5-diphenyl-1-[2-(4-methoxyphenoxy)ethyl]pyrrole is prepared from 2,5-diphenylpyrrole and 2-(4-methoxyphenoxy)ethyl bromide.

2,5-bis(4-fluorophenyl)-1-[3 - (4-ethoxyphenoxy)propyl]pyrrole is prepared from 2,5-bis(4-fluorophenyl)pyrrole and 3-(4-ethoxyphenoxy)propyl bromide.

2,5-bis(p-trifluoromethylphenyl) - 1 - [2-(p-fluorophenoxy)ethyl]pyrrole is prepared from 2,5-bis(p-trifluoromethylphenyl)pyrrole and 2-(p-fluorophenoxy)ethyl chloride.

EXAMPLE 3

1-(3-dimethylaminopropyl)-2,5-diphenylpyrrole hydrochloride

A mixture of 8.5 g. (0.036 mole) of 1,2-dibenzoylethane and 7.4 g. (0.072 mole) of N,N-dimethyl-1,3-propanediamine in 100 ml. of glacial acetic acid was refluxed for two and one half hours. After cooling and adding 100 ml. of water, the solution was made basic and extracted with ether. The ether layer was extracted with 3 N HCl. The aqueous acid layer was made basic and extracted with ether. After drying the final ethereal extracts over anhydrous magnesium sulfate, the solution was concentrated. The 8.3 g. of residue was dissolved in benzene and placed on a magnesium silicate column. Using a gradient elution of acetonebenzene, 7.0 g. (64%) of product was obtained. The hydrochloride salt was made and it was recrystallized from isopropanol-ether. The melting point of the recrystallized material was 211–213° C.

*Analysis.*—Calculated for $C_{21}H_{25}ClN_2O$ (percent): C, 73.99; H, 7.39; N, 8.22. Found (percent): C, 74.03; H, 7.56; N, 7.94.

Utilizing the procedure of Example 3, the following compounds are prepared:

1-(2-diethylamino ethyl)-2,5-bis(4-chlorophenyl)pyrrole is prepared from 1,2-di-(4-chlorobenzoyl)ethane and N,N-diethyl-1,2-ethanediamine.

1 - (4 - aminobutyl) - 2,5 - bis(4-methylphenyl)pyrrole is prepared from 1,2-di-(4-methylbenzoyl)ethane and 1,4-butanediamine.

1-(5-dimethylaminopentyl) - 2,5 - bis( 4 - dimethoxyphenyl)pyrrole is prepared from 1,2-di-(4-methoxybenzoyl)ethane and N,N-dimethylaminopentanediamine.

EXAMPLE 4

2,5-diphenyl-1-(2-morpholinylethyl)pyrrole hydrochloride monohydrate

A mixture of 8.0 g. (0.033 mole) of 1,2-dibenzoylethane, 4.0 g. (0.31 mole) of 4-(2-aminoethyl)morpholine, 30 ml. of glacial acetic acid and 20 ml. of methanol was refluxed for 16 hours. After adding 50 ml. of water to the mixture, it was made basic with sodium hydroxide. The mixture was extracted with benzene and the combined extracts were dried with anhydrous sodium sulfate. The benzene mixture was filtered and the filtrate was concentrated under vacuum. The solid residue was dissolved in isopropanol and an excess of ethereal HCl was added. The hydrochloride which separated was dissolved in isopropanol and the solution was treated with charcoal. After filtration, 2.75 g. (21%) of hydrochloride was obtained and melted at 182.5–184° C.

*Analysis.*—Calculated for $H_{26}H_{27}ClN_2O_2$ (percent): C, 68.29; H, 7.04; N, 7.24. Found (percent): C, 68.51; H, 7.00; N, 7.36.

The following compounds are prepared using the procedure of Example 4:

2,5 - bis(4 - ethoxyphenyl)-1-(3-pyrrolidinylpropyl)pyrrole is prepared from 1,2-(di-(4-ethoxybenzoyl)ethane and 1-(3-aminopropyl)pyrrolidine.

2,5 - diphenyl-1-(2-piperidinylethyl)pyrrole is prepared from 1,2-dibenzoylethane and 1-(2-aminoethyl)piperidine.

EXAMPLE 5

1-(2,3-dihydroxypropyl)-2,5-diphenylpyrrole

A mixture of 15 g. (0.063 mole) of 1,2-dibenzoylethane and 4.8 g. (0.06 mole) of 3-amino-1,2-propanediol in 75 ml. of methanol and 25 ml. of glacial acetic acid was refluxed for 20 hours. After adding 20 ml. of water, the mixture was extracted with chloroform. The combined extracts were dried and filtered. The filtrate was concentrated under vacuum and 16.0 g. (91%) of an oily residue was obtained which crystallized upon standing. The solid was recrystallized from isopropyl ether and melted at 105–109° C. The analytical sample was obtained by molecular distillation.

*Analysis.*—Calculated for $C_{19}H_{19}NO_2$ (percent): C, 77.79; H, 6.53; N, 4.78. Found (percent): C, 77.54; H, 6.43; N, 4.64.

Utilizing the procedure of Example 5, the following compounds are prepared:

1 - (3,4 - dihydroxybutyl) - 2,5 - bis(4 - chlorophenyl)-pyrrole is prepared from 1,2-di-(4-chlorobenzoyl)ethane and 4-amino-1,2-butanediol.

1 - (4,5-dihydroxypentyl)-2,5-bis(4-fluorophenyl)pyrrole is prepared from 1,2-di-(4-fluorobenzoyl)ethane and 5-amino-1,2-pentanediol.

EXAMPLE 6

4-[1-(2-5-diphenylpyrryl)methyl]-2-dioxolanone

A solution of 4.0 g. (0.04 mole) of phosgene in 37 ml. of chloroform was added dropwise to a stirring solution of 11.7 g. (0.04 mole) of 1-(2,3-dihydroxypropyl)-2,5-diphenylpyrrole in 50 ml. of benzene. The mixture was stirred at room temperature for three hours. The mixture was added to 200 ml. of concentrated ammonium hydroxide and the basic mixture was stirred for 30 minutes. The layers were separated and the benzene layer was dried with anhydrous sodium sulfate. The dried benzene solution was filtered and the filtrate concentrated. The solid residue was recrystallized from an isopropanol-methanol mixture. The recrystallized solid weighed 7.3 g. (57%) and melted at 169.5–172.5° C.

*Aanalysis.*—Calculated for $C_{20}H_{17}NO_3$ (percent): C, 75.22; H, 5.37; N, 4.39. Found (percent): C, 75.11; H, 5.39; N, 4.47.

The following compounds are prepared by the procedure used in Example 6:

4 - {2 - [2,5 - bis( 4 - chlorophenyl)pyrryl]ethyl}-2-dioxolanone is prepared from 1-(3,4-dihydroxybutyl)-2,5-bis(4-chlorophenyl)pyrrole and phosgene.

4 - {3 - [2,5 - bis(4 - ethylphenyl)pyrryl]propyl}-2-dioxolanone is prepared from 1-(4,5-dihydroxypentyl)-2,5-bis(4-ethylphenyl)-pyrrole and phosgene.

EXAMPLE 7

2,5-diphenyl-1-(3-hydroxypropyl)pyrrole

A mixture of 15.0 g. (0.063 mole) of 1,2-dibenzoylethane, 4.75 g. (0.063 mole) of 3-aminopropanol, 25 ml. of glacial acetic acid and 75 ml. of ethanol was refluxed for 16 hours. After the addition of 100 ml. of water, the mixture was extracted with chloroform. The collected extracts were dried with anhydrous sodium sulfate. After filtration, the filtrate was concentrated under vacuum. Thin layer chromatography and nuclear magnetic resonance showed the presence of both 2,5-diphenyl-1-(3-hydroxypropyl)pyrrole and 1-(3-acetoxypropyl)-2,5-diphenylpyrrole. The mixture was dissolved in 50 ml. of ethanol, and after adding an excess of 6 N sodium hydroxide, the mixture was stirred and heated for one hour. After adding 50 ml. of water, the mixture was extracted with chloroform. The combined chloroform extracts were dried with anhydrous sodium sulfate. After filtration, the filtrate was concentrated under vacuum. The solid residue weighed 10.3 g. (59%) and upon recrystallization from pet. ether the colorless needles obtained melted at 68.5 to 70° C.

*Analysis.*—Calculated for $C_{19}H_{19}NO$ (percent): C, 82.28; H, 6.91; N, 5.05. Found (percent): C, 81.96; H, 6.99; N, 5.07.

Utilizing the procedure of Example 7, the following compounds are prepared:

2,5-bis(4-methoxyphenyl)-1-(4-hydroxybutyl)pyrrole is prepared from 1,2-di-(4-methoxybenzoyl)ethane and 4-aminobutanol.

2,5 - bis(4-chlorophenyl)-1-(2-hydroxyethyl)pyrrole is prepared from 1,2-di-(4-chlorobenzoyl)ethane and 2-aminoethanol.

EXAMPLE 8

2,5-diphenyl-1-[3-(N-methylcarbamoyloxy)propyl]pyrrole

A solution of 0.42 g. (0.007 mole) of methyl isocyanate in 10 ml. of dry benzene was added to a solution of 2.0 g. (0.007 mole) of 1-(3-hydroxypropyl)-2,5-diphenylpyrrole in 50 ml. of dry benzene and the mixture was stirred for one hour. The mixture was concentrated under vacuum. The residue was crystallized by triturating in isopropyl ether. The dried crystalline solid weighed 2.1 g. (90%) and melted at 109.5–111.5° C.

*Analysis.*—Calculated for $C_{21}H_{22}N_2O_2$ (percent): C, 75.42; H, 6.63; N, 8.38. Found (percent): C, 75.45; H, 6.73; N, 8.38.

The following compounds are prepared by using the procedure of Example 8:

2,5-bis(4-methoxyphenyl) - 1 - [4 - N - ethylcarbamoyloxy)butyl]pyrrole is prepared from 2,5-bis(4-methoxyphenyl)-1-(4-hydroxybutyl)pyrrole and ethyl isocyanate.

2,5-bis(4-chlorophenyl)-1-[2-N - propylcarbamoyloxy)ethyl]pyrrole is prepared from 2,5-bis(4-chlorophenyl)-1-(2-hydroxyethyl)pyrrole and propyl isocyanate.

EXAMPLE 9

1-[3-(1-acetyl-4-piperidinylcarbonyloxy)propyl]-2,5-diphenylpyrrole

A mixture of 3.0 g. (0.011 mole) of 1-(3-hydroxypropyl)-2,5-diphenylpyrrole, 4.8 g. (0.044 mole) of anhydrous sodium carbonate and 4.2 g. (0.022 mole) of 1-acetylisonipecotic acid chloride in 100 ml. chloroform was refluxed for 20 hours. Water was added to the mixture and the layers separated. The chloroform layer was dried over anhydrous sodium sulfate and filtered. The filtrate was concentrated under vacuum. The solid residue was recrystallized from methanol and 2.0 g. (42%) of product melting at 117.5–119.5° C. was obtained.

*Analysis.*—Calculated for $C_{27}H_{30}N_2O_3$ (percent): C, 75.32; H, 7.02; N, 6.51. Found (percent): C, 75.16; H, 7.05; N, 6.45.

Utilizing the procedure of Example 9, 1-[4-(1-acetyl-4 - piperazinylcarbonyloxy)butyl] - 2,5 - bis(4 - methoxyphenyl)pyrrole is prepared from 2,5-bis(4-methoxyphenyl)-1-(4-hydroxybutyl)pyrrole and 4-chlorocarbonyl-1-acetylpiperazine.

PHARMACOLOGY

The compounds of Formula I are primarily useful as analgetics. They were tested for analgetic activity by the method of Nilsen. When, for example, 1-(3-dimethylaminopropyl)-2,5-diphenylpyrrole was tested in female mice, the $ED_{50}$ was found to be 9.3 mg./kg., i.p. (95% confidence limits, 3.6–24.2 mg./kg., i.p.). There were no observable side effects at this dose level.

Formulation and administration.—Effective quantities of any of the foregoing pharmacologically active compounds may be administered to a living animal body in any one of various ways, for example, orally, as in capsules or tablets, parenterally in the form of sterile solutions or suspensions, and in some cases intravenously in the form of sterile solution. The free basic amino compounds, while effective, are preferably formulated and administered in the form of their non-toxic acid-addition salts for purposes of convenience of crystallization, increased solubility, and the like.

Although very small quantities of the active materials of the present invention, even as low as one milligram, are effective when minor therapy is involved or in cases of administration to subjects having a relatively low body weight, unit dosages are usually five milligrams or above and preferably twenty-five, fifty or one hundred milligrams. Five to fifty milligrams appear optimum per unit dose, while usual broader ranges appear to be one to 500 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount; i.e., such that a suitable effective dosage will be obtained consistent with the dosage form employed. Obviously, several unit dosage forms may be administered at about the same time. The exact individual dosages, as well as daily dosages in a particular case, will of course be determined according to established medical principles under the direction of a physician or veterinarian.

Examples of compositions within the preferred ranges given are as follows:

Capsules

| Ingredients: | Per cap., mg. |
|---|---|
| (1) Active ingredient, as salt | 25.0 |
| (2) Lactose | 146.0 |
| (3) Magnesium stearate | 4.0 |

Procedure:
(1) Blend 1, 2, and 3.
(2) Mill this blend and blend again.
(3) This milled blend is then filled into No. 1 hard gelatin capsules.

Tablets

| Ingredients: | Mg./tab. |
|---|---|
| (1) Active ingredient, as salt | 25.0 |
| (2) Corn starch | 20.0 |
| (3) Alginic acid | 20.0 |
| (4) Sodium alginate | 20.0 |
| (5) Magnesium stearate | 1.3 |

Procedure:
(1) Blend 1, 2, 3, and 4.
(2) Add sufficient water portionwise to the blend from step No. 1 with careful stirring after each addition. Such additions of water and stirring continue until the mass is of a consistency to permit its conversion to wet granules.
(3) The wet mass is converted to granules by passing it through the oscillating granulator, using 8-mesh screen.
(4) The wet granules are then dried in an oven at 140° F.
(5) The dried granules are then passed through an oscillating granulator, using a 10-mesh screen.
(6) Lubricate the dry granules with 0.5% magnesium stearate.
(7) The lubricated granules are compressed on a suitable tablet press.

Intramuscular injection

Ingredients (per ml.):
(1) Active ingredient, as salt, mg. _____ 25.0
(2) Isotonic buffer solution 4.0, q.s. to 2.0 ml.

Procedure:
(1) Dissolve the active ingredient in the buffer solution.
(2) Aseptically filter the solution from step No. 1.
(3) The sterile solution is now aseptically filled into sterile ampoules.
(4) The ampoules are sealed under aseptic conditions.

Various modifications will be apparent to one skilled in the art and may be made in the compositions and procedures of the present invention without departing from the spirit or scope thereof, and it is therefore to be understood that the invention is to be limited only by the scope of the appended claims.

What is claimed:

1. A compound selected from the group consisting of 1-substituted-2,5-diphenylpyrroles having the formula:

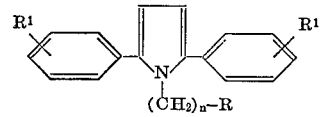

wherein;
R is selected from the group consisting of amino, di-lower-alkyl amino, morpholinyl, pyrrolidinyl, and piperidinyl,
$R^1$ is selected from the group consisting of hydrogen, lower alkyl, lower alkoxy, trifluoromethyl and halogen having an atomic weight less than 80,
$n$ is an integer from 1 to 5 inclusive and acid-addition salts thereof.

2. A compound according to claim 1 designated 1-(2-dimethylaminoethyl)-2,5-diphenyl-pyrrole.

3. A compound according to claim 1 designated 1-(3-dimethylaminopropyl)-2,5-diphenylpyrrole.

4. A compound according to claim 1 designated 2,5-diphenyl-1-(2-morpholinylethyl)pyrrole.

References Cited

Gabel, J. Med. Chem. (1968), vol. 11, pp. 403–04.

ALEX MAZEL, Primary Examiner

J. A. NARCAVAGE, Assistant Examiner

U.S. Cl. X.R.

260—268 C, 294.3 E, 294.7 C, 326.3, 326.5 G, 326.5 M, 326.9; 424—274

UNITED STATES PATENT OFFICE
CERTIFICATE OF CORRECTION

Patent No. 3,631,037         Dated  Dec. 28, 1971

Inventor(s) Robert Louis Duncan, Jr. and William J. Welstead, Jr.

It is certified that error appears in the above-identified patent and that said Letters Patent are hereby corrected as shown below:

Column 3, lines 3 to 7, the formula should appear as shown below instead of as in the patent:

(A) 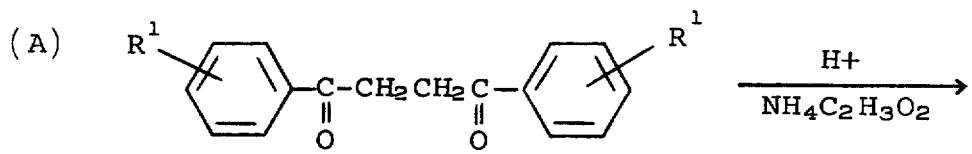

Column 6, line 68, change "$H_{26}H_{27}ClN_2O_2$" to read --$C_{26}H_{27}ClN_2O_2$--

Signed and Sealed this

Twenty-fifth Day of January 1977

[SEAL]

Attest:

RUTH C. MASON
*Attesting Officer*

C. MARSHALL DANN
*Commissioner of Patents and Trademarks*